United States Patent [19]

Subramanian

[11] Patent Number: 4,520,183
[45] Date of Patent: May 28, 1985

[54] PROCESS FOR MAKING RANDOM ETHYLENE/ALKYL ACRYLATE COPOLYMERS

[75] Inventor: Narayanan S. Subramanian, Hockessin, Del.

[73] Assignee: E. I. Du Pont de Nemours and Company, Wilmington, Del.

[21] Appl. No.: 452,283

[22] Filed: Dec. 22, 1982

[51] Int. Cl.$^3$ .......................................... C08F 210/02
[52] U.S. Cl. .................................... 526/318; 526/242; 526/284; 526/292.2; 526/292.3; 526/292.4; 526/305; 526/306
[58] Field of Search ...................... 526/242, 284, 292.2, 526/292.3, 292.4, 305, 306, 318

[56] References Cited

U.S. PATENT DOCUMENTS

| | | | |
|---|---|---|---|
| 3,544,490 | 12/1970 | Alexander et al. | 260/2.5 |
| 3,714,099 | 1/1973 | Biale | 260/29.67 |
| 3,714,100 | 1/1973 | Biale et al. | 260/29.6 |
| 3,739,567 | 6/1973 | Williamson | 37/153 |
| 3,835,086 | 9/1974 | Bergmeister et al. | 260/33.6 |
| 3,883,489 | 5/1975 | Matschke et al. | 260/78.5 |
| 3,887,653 | 6/1975 | Konishi et al. | 260/885 |
| 3,898,301 | 8/1975 | Konishi et al. | 260/876 |
| 3,904,588 | 9/1975 | Greene | 260/78.5 |
| 3,925,327 | 12/1975 | Mitsushima et al. | 260/78.5 |
| 4,065,613 | 12/1977 | Logothetis | 526/292 |
| 4,089,828 | 5/1978 | Vasishth et al. | 526/318 |
| 4,399,263 | 8/1983 | Brodoway | 525/382 |
| 4,668,158 | 6/1972 | Keithley | 260/17 |

FOREIGN PATENT DOCUMENTS

| | | |
|---|---|---|
| 2519431 | 11/1975 | Fed. Rep. of Germany . |
| 1072723 | 6/1967 | United Kingdom . |
| 1498414 | 1/1978 | United Kingdom . |

*Primary Examiner*—Harry Wong, Jr.

[57] ABSTRACT

An improved continuous process for producing random ethylene/acrylate/cure-site copolymers with greater efficiency by copolymerizing therewith a small quantity of certain polyfunctional monomers, such as diallyl maleate.

20 Claims, No Drawings

PROCESS FOR MAKING RANDOM ETHYLENE/ALKYL ACRYLATE COPOLYMERS

TECHNICAL FIELD

This invention relates to an improved continuous process for making elastomeric random copolymers derived from ethylene, alkyl acrylates, and 1,4-butenedioic acid esters and to elastomeric random copolymers derived from ethylene, alkyl acrylates, 1,4-butenedioic acid esters and polyfunctional monomers, which copolymers are made by the improved process, and the improved properties possessed by such polymers as compared with similar polymers not containing polyfunctional monomer. In particular, this invention relates to the significant improvement in the throughput of a continuous process for making such elastomeric copolymers having a particular bulk viscosity and the concomitant improvement in handling during isolation and processing behavior. In addition, this invention relates to the significant improvement in the curing characteristics and physical properties of the cured copolymer that reult when the copolymer of the present invention is peroxide cured.

BACKGROUND ART

U.S. Pat. No. 3,904,588, granted Sept. 9, 1975, to Greene discloses a continuous process for preparing certain random ethylene/alkyl acrylate/carboxylic acid elastomeric terpolymers which have certain particularly desirable properties. In particular, Greene is directed to elastomeric random terpolymers derived from ethylene, methyl or ethyl acrylate, and an alkyl ester of 1,4-butenedioic acid, which terpolymer possesses exceptional oil resistance and low temperature physical properties that render it particularly suitable for certain industrial applications. The process of the present invention permits preparation of polymers similar to Greene in both composition and properties, particularly bulk viscosity, with a significantly greater throughput, i.e. speed of manufacture, than is possible in preparing the polymers of Greene. In addition, the curing characteristics of the polymers of the present invention and the physical properties of the cured copolymers of the present invention are improved, as compared with Greene's copolymers, when such copolymers are peroxide cured.

Copending U.S. patent application Ser. No. 334,160, filed Dec. 24, 1981 by Nicolas Brodoway, now U.S. Pat. No. 4,399,263, issued Aug. 16, 1983, discloses the modification of elastomeric ethylene/alkyl acrylate/1,4-butenedioic acid ester random terpolymers for the purpose, among others, of increasing the molecular weight (and the bulk viscosity) of such copolymers by reacting the polymer with an amine subsequent to polymerization. For the Brodoway process to be effective, it is necessary for the continuous polymerization to be conducted in such a way as to convert a significant proportion of the carboxylic cure sites to anhydride, which anhydride moiety is capable of reacting with the amine. In contrast, the present invention relates to a process for making ethylene/alkyl acrylate/1,4-butenedioic acid ester random copolymers by co-polymerization of a polyfunctional monomer with ethylene, alkyl acrylate and 1,4-butenedioic acid ester, which process produces a polymer having comparable bulk viscosity much more rapidly than equivalent terpolymer being prepared without polyfunctional monomer, and which resultant polymer has certain other improved properties as described in detail elsewhere in this application.

U.S. Pat. No. 4,065,613, granted Dec. 27, 1977 to Logothetis discloses a batch solution polymerization process of preparing certain ethylene/alkyl acrylate alternating copolymers containing certain branching agents copolymerized therewith, where the branching agent is direactive and may be selected from diacrylates, diolefins and olefin-acrylates. The Logothetis alternating copolymers also optionally contain cure-site monomers, including mono-esters of maleic and fumaric acid. The process of the present invention is continuous, not batch, is based upon a bulk, free-radical polymerization, not a solution polymerization, and produces polymers that are random, not alternating, and do not contain equimolar amounts of ethylene and acrylate.

DISCLOSURE OF THE INVENTION

This invention relates to an improved continuous process for making elastomeric random copolymers derived from ethylene, alkyl acrylates, and 1,4-butenedioic acid esters, and to elastomeric random copolymers derived from ethylene, alkyl acrylates, 1,4-butenedioic acid esters and polyfunctional monomers, which copolymers are made by the improved process, and to the improved properties possessed by such polymers as compared with similar polymers not containing polyfunctional monomer. In particular, the present invention relates to the improved process for making the elastomeric copolymers of the type described generally above and in more detail below, the polymers made by the improved process, the compositions containing such copolymers, to the process for vulcanizing such copolymers, and to vulcanized articles made from such copolymers.

It has been found that ethylene/alkyl acrylate/cure-site elastomeric random copolymers having the bulk viscosity of the elastomeric terpolymers of the general type described by Greene in U.S. Pat. No. 3,904,588 can be prepared continuously and much more quickly by copolymerizing into such elastomeric copolymers a small quantity of certain polyfunctional monomers. More specifically, it has been found that copolymers of the general type disclosed by Greene having comparable bulk viscosity can be made significantly faster by copolymerizing a small quantity of certain polyfunctional monomers with the ethylene, alkyl acrylate and 1,4-butenedioic acid ester one would normally copolymerize to form the Greene terpolymers.

It has also been found that incorporation of a small quantity of certain polyfunctional monomers into the Greene terpolymers to achieve a comparable bulk viscosity more quickly also results in greater ease of handling of the polymer during isolation of the polymer from the polymerization reaction mixture, and in improved processing behavior.

It has also been found that when the tetrapolymers of the present invention are formulated in non-black compositions (i.e. a rubber formulation not containing any carbon-black) and are peroxide cured (i.e. vulcanized with a peroxide curing agent, rather than the more common amine curing agents), then the polymer has adequate scorch safety, vulcanizes at a significantly faster rate, and achieves a higher state of cure than otherwise equivalent terpolymers.

It has also been found that when the tetrapolymers of the present invention are formulated in non-black compositions and are peroxide cured, then the resulting vulcanized article possesses significantly improved tensile properties.

As mentioned above, the random copolymers of the present invention derive from ethylene, alkyl acrylates, 1,4-butenedioic acid esters, and polyfunctional monomers. The alkyl acrylate will be selected from the group consisting of methyl acrylate and ethyl acrylate and will comprise 40-62 percent by weight of the copolymer. Preferably the acrylate will comprise 52-58 weight percent of the copolymer. Methyl acrylate is preferred.

The 1,4-butenedioic acid ester will be a monoalkyl ester of 1,4-butenedioic acid and will comprise 0.1-10.0 weight percent of the copolymer. Preferably, the ester will comprise 0.5-5.0 weight percent of the copolymer. Suitable monoalkyl esters include those having 1-6 carbons in the alkyl chain. Preferably, the monoalkyl ester will be the monoethyl ester of maleic anhydride (i.e. ethyl hydrogen maleate).

The polyfunctional comonomer will comprise from 0.1-5 weight percent of the copolymer, preferably 1-3 weight percent, and will be selected from the group consisting of:

(a) allyl and vinyl esters of $C_2$-$C_{20}$ alkanoic, $C_4$-$C_{20}$ alkenoic, $C_8$-$C_{14}$ aromatic and $C_9$-$C_{20}$ aralkanoic polycarboxylic acids, where a polycarboxylic acid is an acid having at least two —COOH groups, provided that at least two of the —COOH groups have been esterified.

(b) N-allyl and N-vinyl amides of $C_2$-$C_{20}$ alkanoic, $C_4$-$C_{20}$ alkenoic, $C_8$-$C_{14}$ aromatic and $C_9$-$C_{20}$ aralkanoic polycarboxylic acids, where a polycarboxylic acid is an acid having at least two —COOH groups, provided that at least two of the —COOH groups have been amidated, (c) acrylic esters and acrylic amides of $C_2$-$C_{20}$ alkyl, aryl and arylalkyl polyols and polyamines, where polyols are alcohols having at least two hydroxyl groups and polyamines are amines having at least two amine groups, provided that at least two of the hydroxyl groups have been esterified and at least two of the amine groups have been amidated with an acrylic group of the formula $$CH_2=\overset{X}{\underset{|}{C}}-\overset{O}{\underset{||}{C}}-$$

where X is H, $C_1$-$C_{10}$ alkyl, $C_6$-$C_{10}$ aryl, $C_6$-$C_{10}$ aralkyl, F, Cl or Br, (d) an olefin—acrylate of the formula $$CH_2=\overset{x}{\underset{|}{C}}-\overset{O}{\underset{||}{C}}-O-(CH_2)_n-\overset{R}{\underset{|}{C}}=CH_2$$

where x=H or $CH_3$, n=0 or 1, R is H or $C_6$-$C_{20}$ aryl, and (e) a diolefin of the formula $$CH_2=CH-R-CH=CH_2$$

where R is

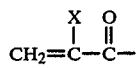, 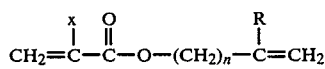

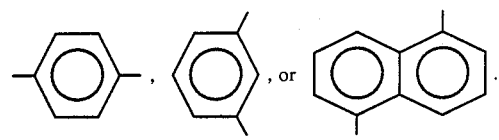

Preferred polyfunctional comonomers include diallyl maleate, ethylene diacrylate, ethylene dimethacrylate, 1,6-hexane diol diacrylate, trimethylol propane triacrylate, trimethylol propane trimethacrylate, pentaerythritol triacrylate, pentaerythritol trimethacrylate, pentaerythritol tetraacrylate, tetraethylene glycol diacrylate, tripropylene glycol diacrylate and diallyl fumarate. Diallyl maleate, ethylene dimethacrylate, trimethylol propane triacrylate and ethylene diacrylate are most preferred.

In addition to the three monomers described above, the copolymers of the present invention will contain a complemental amount of ethylene.

Preparation of the copolymers of the present invention will be generally conducted as disclosed by Greene for the preparation of ethylene/acrylate/1,4-butenedioic acid ester terpolymers in U.S. Pat. No. 3,904,588, the subject matter of which is hereby incorporated herein by reference. In particular, the copolymerization can be carried out in a pressure reactor at temperatures ranging from 90°-250° C., preferably 145°-165° C., and pressures ranging from 1600-2200 atmospheres (160-220 MPa), preferably 1800-2000 atmospheres (180-200 MPa). The polymerization will be run as a continuous process wherein the total conversion of monomers to polymer is 5-18 weight percent, preferably 10-16 weight percent. Unreacted monomer may be recirculated. The melt index of the tetrapolymers of the present invention will range from 0.1-10 dg/min., preferably 0.3-3.0 dg/min.

The elastomeric polymers of the present invention can be cured and compounded as discussed by Greene in U.S. Pat. No. 3,904,588. For example, it is stated there that such polymers can be vulcanized in the presence of amine curing systems, such as hexamethylenediamine, hexamethylenediamine carbamate, tetramethylenepentamine, hexamethylenediamine cinnamaldehyde adduct, as well as hexamethylenediamine dibenzoate salt. Aromatic amines can also be used as curing agents. Examples of typical suitable amine curing system recipes are also given in Greene; see, for example, Table II therein.

The tetrapolymers of the present invention can also be compounded in non-black formulations and vulcanized in the presence of peroxide curing systems as discussed by Greene in U.S. Pat. No. 3,904,588. In such systems, the polymers possess the added advantage of improved tensile properties.

The vulcanizates of the present invention may also contain an antioxidant system based on a phosphorus ester antioxidant, a hindered phenolic antioxidant, an amine antioxidant, or a mixture of two or more of these compounds. The phosphorus ester compound can be, for example: tri(mixed mono- and dinonylphenyl) phosphite, tris(3,5-di-t-butyl-4-hydroxyphenyl) phosphate, high molecular weight poly(phenolic phosphonates), and 6-(3,5-di-t-butyl-4-hydroxy)benzyl-6H-dibenz-[c,e][1,2]oxaphosphorin-6-oxide.

The hindered phenolic compounds include, for example, the following: 4,4'-butylidenebis(6-t-butyl-m-cresol), 1,3,5-trimethyl-2,4,6-tris-(3,5-di-t-butyl-4-hydroxybenzyl) benzene, 2,6-di-t-butyl- -dimethylamino-p-cresol, and 4,4'-thiobis-(3-methyl-6-t-butyl-phenol).

Suitable amine antioxidants include, among others, the following: polymerized 2,2,4-trimethyl-1,2-dihydroquinoline; N-phenyl-N'-(p-toluenesulfonyl)-p-phenylenediamine; N,N'-di(β-naphthyl)-p-phenylenediamine; low temperature reaction product of phenyl (β-naphthyl) amine and acetone; and 4,4'-bis(α,α-dimethylbenzyl)-diphenylamine.

The proportion of the antioxidant compound in the vulcanizing composition is 0.1–5 parts per 100 parts of polymer, the preferred proportion being 0.5–2.5.

The antioxidant improves the heat aging of the compositions. The antioxidant effect is usually quite low below the preferred range and impractically low below the broad range recited above. Above the higher limits, little additional improvement is observed, and there may be adverse effects on the state of cure. The weight ratio of the phenolic or amine antioxidant to the phosphorus compound in the mixtures is about 0.5–3, the preferred ratio being about 1.

The preferred antioxidant compositions contain tri(-mixed mono and dinonylphenyl) phosphite in mixture with either 4,4'-bis(α,α-dimethylbenzyl)-diphenylamine or 4,4'-butylidenebis(6-t-butyl-m-cresol).

It is often desirable to add fillers to reduce cost and to improve mechanical properties. A typical vulcanized composition will usually contain about 15–40 volume percent of fillers, for example, carbon black, barium sulfate, magnesium silicate, or silica. Other conventional fillers can also be used. The preferred proportion of the fillers is 20–25 volume percent, and also depends on the reinforcing effect of the individual fillers. Below the lower limit, the improvement of tensile properties is quite low, while above the upper limit, the heat aging resistance of the polymer is adversely affected.

The following examples identify various specific elastomeric copolymers of the present invention and their relative properties.

In addition to providing an evaluation of the improved properties of the elastomeric polymers of the present invention, the examples also illustrate that these improved properties are not achieved in compositions outside the scope of the present invention, including equivalent polymers with no polyfunctional comonomer. All parts and percentages are by weight and all temperatures are in degrees Celsius unless otherwise specified. Measurements not originally in SI units have been so converted and rounded where appropriate.

EXAMPLE 1

Polymer Preparation 6.34 kg/h of ethylene plus two liquid monomer streams, a first liquid monomer stream containing 95.7% methyl acrylate, 4.2% monoethyl ester of 1,4-butenedioic acid and 0.1% butylated hydroxy toluene and a second liquid monomer stream containing 80.3% methacrylate, 3.6% monoethyl ester of 1,4-butenedioic acid, 16.0% diallyl maleate (DAM) and 0.1% butylated hydroxy toluene, were fed continuously to a 720 ml adiabatic continuous stirred reactor. In addition 0.5–0.6 kg/h of methanol was fed to the reactor as a telogen. The flow rates of the two liquid monomer feed pumps were controlled to obtain the desired level of DAM in the tetrapolymer. In particular a flow rate of 0.86 kg/h for the first liquid monomer stream and a flow rate of 0.163 kg/h for the second stream gave a polymer containing 2.5 wt % DAM. In the preparation of the terpolymer, the second liquid monomer stream was not used, and the flow rate of the first stream was increased to equal the total flow rate of the two streams used in preparing the tetrapolymer, namely 1.02 kg/h. Reaction was initiated and maintained by the addition of di(sec butyl) peroxydicarbonate (20% PDC/80% t-butyl benzene). Reaction conditions: Reactor temperature=160° C., Pressure=186 MPa, Total monomer conversion=15±1%. Approximately 10 kg of the tetrapolymer having a composition of 40/53.5/4/2.5 wt. % of E/MA/MAME/DAM and an average melt flow rate (2160 gram weight, 190° C.) of 2 was prepared. The terpolymer had an average composition of 41 weight percent ethylene, 55 weight percent methylacrylate, and 4 weight percent monoethyl ester of 1,4-butenedioic acid. The terpolymer had an average melt flow rate (2160 gram weight, 190° C.) of about 7.

EXAMPLE 2

Black Product Evaluation

The polymer of Example 1 was evaluated in a typical black, amine-cured formulation. The polymers and the other ingredients listed below were mixed on a rubber mill and the compounds were evaluated.

| Ingredients | Compound | | | |
|---|---|---|---|---|
| | A | B | C | D |
| Terpolymer of Ex. 1 | 100 | — | 100 | — |
| Tetrapolymer of Ex. 1 | — | 1.0 | — | 100 |
| SRF Carbon Black | 55 | 5 | 20 | 20 |
| FEF Carbon Black | — | — | 50 | 50 |
| Tris(nonylphenyl)phosphite | 1 | 1 | 1 | 1 |
| Substituted Diphenylamine | 1 | 1 | 1 | 1 |
| Polyethylene Oxide | 2 | 2 | 2 | 2 |
| Stearylamine | 0.5 | 0.5 | 0.5 | 0.5 |
| Stearic Acid | 2 | 2 | 2 | 2 |
| Complex Alkylacid Phosphate | 1.5 | 1.5 | 1.5 | 1.5 |
| Dioctylsebacate | — | — | 10 | 10 |
| Polyester Plasticizer | — | — | 10 | 10 |
| Diorthotolylguanidine | 4 | 4 | 4 | 4 |
| Hexamethylenediamine Carbamate | 1.25 | 1.25 | 1.25 | 1.25 |

The values for Mooney Scorch (ASTM D-1646), ODR (ASTM D-2084), Instron S/S (ASTM D-412), Compression Set (ASTM D-395 Method B), and Hardness (ASTM D-2240) are as follows:

| Physical Properties | Compound | | | |
|---|---|---|---|---|
| | A | B | C | D |
| Mooney Scorch at 121° C. | | | | |
| Minimum | 10.1 | 11.5 | 8 | 9.2 |
| 10 pt. rise, mins. | 14.7 | 13.0 | 17.8 | 19.5 |
| ODR data at 177° C. | | | | |
| Torque at 30 mins: dN · M | 26.8 | 24.2 | 21.9 | 20.3 |
| Min. Torque | 2.3 | 2.4 | 2.1 | 2.1 |
| T$_c$-90, min. | 13.3 | 17.0 | 10.6 | 18.0 |
| Max. cure rate; dN · M/min. | 3.9 | 3.3 | 3.5 | 2.6 |
| Instron S/S data at 25° C. - Press cured 15'/177° C. | | | | |
| M$_{100}$, MPa | 2.5 | 2.1 | 2.8 | 2.7 |
| T$_B$, MPa | 13.1 | 13.6 | 10.5 | 10.1 |
| E$_B$, % | 490 | 545 | 450 | 390 |
| Instron S/S data at 25° C. - Heat aged 70 h/204° C. | | | | |
| M$_{100}$, MPa | 5.2 | 6.0 | 6.0 | 7.2 |
| T$_B$, MPa | 13.6 | 15.3 | 12.2 | 11.1 |
| E$_B$, % | 200 | 200 | 205 | 165 |

-continued

| Physical Properties | Compound | | | |
|---|---|---|---|---|
| | A | B | C | D |
| % Retention of $E_B$ | 41 | 37 | 46 | 42 |
| Compression Set 'B' (70 h/150° C.) | | | | |
| Press cured | 60 | 72 | 65 | 72 |
| Post cured | 24 | 24 | 30 | 33 |
| Hardness at 25° C. - Durometer A | 64 | 62 | 67 | 65 |
| Post cured | | | | |

The values for the terpolymer and the tetrapolymer are substantially equivalent. However, the tetrapolymer has a melt flow rate of about 2 while the terpolymer has a melt flow rate of about 8. The melt flow rate is an indicator of the molecular weight of the polymer, and the molecular weight of the polymers produced by the process of the present invention is dependent on the residence time of the monomer reactants in the reactor. Accordingly, it is now possible to make tetrapolymer being otherwise equivalent to the terpolymer (especially in molecular weight and accordingly melt viscosity or melt flow rate) with a much shorter residence time in the reactor (or a much greater throughput). Alternatively, if one desired to make a polymer having higher molecular weight, one need only use the process of the present invention and a longer residence time, such as the flow rates (or residence time) normally used in the preparation of the terpolymer.

EXAMPLE 3

Non-Black Product Evaluation

The polymer of Example 1 was evaluated in a typical non-black, peroxide-cured formulation. The polymers and the other ingredients listed below were mixed on a rubber mill and the compounds were evaluated.

| Ingredients | Compound | | | |
|---|---|---|---|---|
| | A | B | C | D |
| Terpolymer of Example 1 | 100 | 100 | — | — |
| Tetrapolymer of Example 1 | — | — | 100 | 100 |
| Nitrile Butadiene Rubber - 1411 | 10 | 10 | 10 | 10 |
| 4,4'-Butylidenebis(6-t-butyl-3-methyl phenol) | 2 | 2 | 2 | 2 |
| Stearylamine | 0.5 | 0.5 | 0.5 | 0.5 |
| Stearic Acid | 2.5 | 2.5 | 2.5 | 2.5 |
| Complex Alkylacid Phosphate | 0.5 | — | 0.5 | — |
| Fumed Silica | 15 | 15 | 15 | 15 |
| Hydrated Aluminum Oxide | 15 | 15 | 15 | 15 |
| Ground Calcium Carbonate | 100 | 100 | 100 | 100 |
| m-Phenylene bis maleimide | 2 | 2 | 2 | 2 |
| Dicumyl Peroxide on Calcium Carbonate | 7 | 7 | 7 | 7 |

The results on Mooney Scorch, ODR data and Instron measurements are as follows:

| Physical Properties | Compound | | | |
|---|---|---|---|---|
| | A | B | C | D |
| Mooney Scorch at 121° C. | | | | |
| Minimum | 8 | 9.0 | 8.3 | 9.6 |
| 10 pt. rise, mins. | (2) | (1.7) | 28.3 | 28.8 |
| (pt. rise in 30 mins.) | | | | |
| ODR data at 177° C. | | | | |
| Torque at 30 mins: dN · M | 22.8 | 21.8 | 40.3 | 41.0 |
| Min. Torque | 3.3 | 3.3 | 3.7 | 3.7 |
| $T_c$-90, min. | 6.5 | 6.5 | 6.2 | 5.8 |
| Max. cure rate; dN · M/min. | 11.5 | 9.8 | 16.0 | 18.1 |
| Instron S/S data at 25° C. - Press cured 15'/177° C. | | | | |

| Physical Properties | Compound | | | |
|---|---|---|---|---|
| | A | B | C | D |
| $M_{100}$, MPa | 2.6 | 2.8 | 2.9 | 3.5 |
| $T_B$, MPa | 4.9 | 5.1 | 7.6 | 7.9 |
| $E_B$, % | 500 | 580 | 425 | 430 |
| Instron S/S data at 25° C. - Heat aged 70 h/204° C. | | | | |
| $M_{100}$, MPa | 6.6 | 7.2 | 8.4 | 8.7 |
| $T_B$, MPa | 7.1 | 7.8 | 8.5 | 9.5 |
| $E_B$, % | 205 | 190 | 120 | 150 |
| % Retention of $E_B$ | 41 | 33 | 28 | 35 |

Example 3 shows that the tetrapolymer is faster curing, gives a higher state of cure, and is superior in tensile strength in peroxide cured non-black compositions compared to the terpolymer.

INDUSTRIAL APPLICABILITY

The elastomeric polymers of the present invention can be used in substantially the same industrial applications as can the elastomeric polymers of Greene, including ignition wire jacketing, spark plug boots, hose, belts, miscellaneous molded boots, seals, and gaskets. The good low and high temperature physical properties and excellent oil resistance made these elastomers particularly well suited for automotive applications.

BEST MODE

Although the best mode of the present invention, i.e., the single best copolymer of the present invention, will depend upon the particular desired end use and the specific requisite combination of properties for that use, the single most preferred copolymer of the present invention is the tetrapolymer of Example 1.

I claim:

1. In a continuous process for preparing an elastomeric random copolymer derived from the addition polymerization in the presence of free radical initiator of component monomers consisting essentially of:
   (a) 40–62 weight percent of a monomer selected from the group consisting of methyl acrylate and ethyl acrylate,
   (b) 0.1–10.0 weight percent of a monoalkyl ester of 1,4-butenedioic acid, where the alkyl group has 1–6 carbon atoms, and
   (c) 23.0–59.8 weight percent of ethylene, the improvement comprising copolymerizing therewith 0.1–5.0 weight percent of a poly-functional monomer selected from the group consisting of:
      (1) allyl and vinyl esters of $C_2$–$C_{20}$ alkanoic, $C_4$–$C_{20}$ alkenoic, $C_8$–$C_{14}$ aromatic and $C_9$–$C_{20}$ aralkanoic polycarboxylic acids, where the polycarboxylic acid is an acid having at least two —COOH groups, provided that at least two of the —COOH groups have been esterified,
      (2) N-allyl and N-vinyl amides of $C_2$–$C_{20}$ alkanoic, $C_4$–$C_{20}$ alkenoic, $C_8$–$C_{14}$ aralkanoic polycarboxylic acids, where the polycarboxylic acid is an acid having at least two —COOH groups, provided that at least two of the —COOH groups have been amidated,
      (3) acrylic esters and acrylic amides of $C_2$–$C_{20}$ alkyl, aryl and arylalkyl polyols and polyamines, where the polyols are alcohols having at least two hydroxyl groups and the polyamines are amines having at least two amine groups, provided that at least two of the hydroxyl groups have been esterified and at least two of the amine groups have been amidated with an acrylic group of the formula

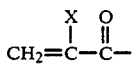

where X is H, $C_1$–$C_{10}$ alkyl, $C_6$–$C_{10}$ aryl, $C_6$–$C_{10}$ aralkyl, F, Cl or Br, (4) an olefin-acrylate of the formula

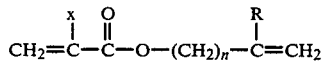

where x=H or $CH_3$, n=0 or 1, R is H or $C_6$–$C_{20}$ aryl, and (5) a diolefin of the formula

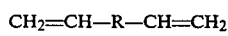

where R is

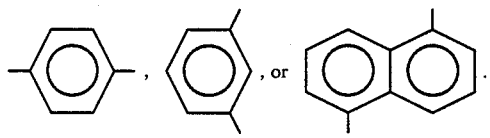

2. The process of claim 1 wherein the polyfunctional monomer is selected from the group consisting of diallyl maleate, ethylene diacrylate, ethylene dimethacrylate, 1,6-hexane diol diacrylate, trimethylol propane triacrylate, trimethylol propane trimethacrylate, pentaerythritol triacrylate, pentaerythritol trimethacrylate, pentaerythritol tetraacrylate, tetraethylene glycol diacrylate, tripropylene glycol diacrylate and dialkyl fumarate.

3. The process of claim 1 wherein the polyfunctional monomer is selected from the group consisting of diallyl maleate, ethylene dimethacrylate, trimethylol propane triacrylate and ethylene diacrylate.

4. The process of claim 1 wherein the polyfunctional monomer is diallyl maleate.

5. The process of claim 1 wherein the component monomer (a) comprises 52–58 weight percent.

6. The process of claim 1 wherein the component monomer (b) comprises 0.5–5.0 weight percent.

7. The process of claim 1 wherein the polyfunctional monomer comprises 1–3 weight percent.

8. The process of claim 1 wherein the component monomer (a) is methyl acrylate.

9. The process of claim 1 wherein the component monomer (b) is the monoethyl ester of 1,4-butenedioic acid.

10. The process of claim 1 wherein
(a) component monomer (a) comprises 52–58 weight percent of methyl acrylate,
(b) component monomer (b) comprises 0.5–5.0 weight percent of the monoethyl ester of 1,4-butenedioic acid, and
(c) the polyfunctional monomer comprises 1–3 weight percent of diallyl maleate.

11. An elastomeric copolymer derived from the addition polymerization in the presence of free radical initiator of component monomers consisting essentially of:

(a) 40–62 weight percent of a monomer selected from the group consisting of methyl acrylate and ethyl acrylate, (b) 0.1–10.0 weight percent of a monoalkyl ester of 1,4-butenedioic acid, where the alkyl group has 1–6 carbon atoms, (c) 0.1–5.0 weight percent of a polyfunctional monomer selected from the group consisting of:

(1) allyl and vinyl esters of $C_2$–$C_{20}$ alkanoic, $C_4$–$C_{20}$ alkenoic, $C_8$–$C_{14}$ aromatic and $C_9$–$C_{20}$ aralkanoic polycarboxylic acids, where the polycarboxylic acid is an acid having at least two —COOH groups, provided that at least two of the —COOH groups have been esterified, (2) N-allyl and N-vinyl amides of $C_2$–$C_{20}$ alkanoic, $C_4$–$C_{20}$ alkenoic, $C_8$–$C_{14}$ aromatic and $C_9$–$C_{20}$ aralkanoic polycarboxylic acids, where the polycarboxylic acid is an acid having at least two —COOH groups, provided that at least two of the —COOH groups have been amidated, (3) acrylic esters and acrylic amides of $C_2$–$C_{20}$ alkyl, aryl and arylalkyl polyols and polyamines, where the polyols are alcohols having at least two hydroxyl groups and the polyamines are amines having at least two amine groups, provided that at least two of the hydroxyl groups have been esterified and at least two of the amine groups have been amidated with an acrylic group of the formula

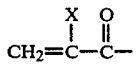

where X is H, $C_1$–$C_{10}$ alkyl, $C_6$–$C_{10}$ aryl, $C_6$–$C_{10}$ aralkyl, F, Cl, or Br, (4) an olefin-acrylate of the formula

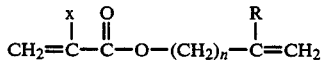

where x=H or $CH_3$, n=0 or 1, R is H or $C_6$–$C_{20}$ aryl, and (5) a diolefin of the formula $CH_2=CH-R-CH=CH_2$ where R is

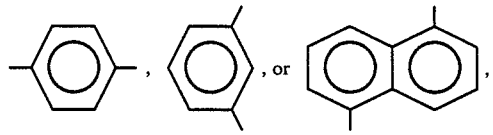

(d) 23.0–59.8 weight percent of ethylene.

12. A copolymer of claim 11 wherein the component monomer (c) is selected from the group consisting of diallyl maleate, ethylene diacrylate, ethylene dimethacrylate, 1,6-hexane diol diacrylate, trimethylol propane triacrylate, trimethylol propane trimethacrylate, pentaerythritol triacrylate, pentaerythritol trimethacrylate, pentaerythritol tetraacrylate, tetraethylene glycol diacrylate, tripropylene glycol diacrylate and dialkyl fumarate.

13. A copolymer of claim 11 wherein the component monomer (c) is selected from the group consisting of diallyl maleate, ethylene dimethacrylate, trimethylol propane triacrylate, and ethylene diacrylate.

14. A copolymer of claim 11 wherein component monomer (a) comprises 52–58 weight percent.

15. A copolymer of claim 11 wherein component monomer (b) comprises 0.5–5.0 weight percent.

16. A copolymer of claim 11 wherein component monomer (c) comprises 1–3 weight percent.

17. A copolymer of claim 11 wherein component monomer (a) is methyl acrylate.

18. A copolymer of claim 11 wherein component monomer (b) is the monoethyl ester of 1,4-butenedioic acid.

19. A copolymer of claim 11 wherein component (c) is diallyl maleate.

20. A copolymer of claim 11 wherein
 (a) component (a) comprises 52–58 weight percent of methyl acrylate,
 (b) component (b) comprises 0.5–5.0 weight percent of the monoethyl ester of 1,4-butenedioic acid, and
 (c) component (c) comprises 1–3 weight percent of diallyl maleate.

* * * * *